United States Patent
Allen et al.

(10) Patent No.: US 9,769,095 B2
(45) Date of Patent: Sep. 19, 2017

(54) APPLICATION BASED DISPLAY LAYOUT SYSTEM AND METHOD

(71) Applicant: International Business Machines Corporation, Armonk, NY (US)

(72) Inventors: Corville O. Allen, Morrisville, NC (US); Faheem Altaf, Pflugerville, TX (US); Robert E. Loredo, North Miami Beach, FL (US); Henri F. Meli, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 13/906,625

(22) Filed: May 31, 2013

(65) Prior Publication Data

US 2014/0359025 A1    Dec. 4, 2014

(51) Int. Cl.
*H04L 29/08* (2006.01)
*H04L 12/58* (2006.01)

(52) U.S. Cl.
CPC .... *H04L 51/04* (2013.01); *G06F 2203/04803* (2013.01); *H04L 67/36* (2013.01)

(58) Field of Classification Search
None
See application file for complete search history.

(56) References Cited

U.S. PATENT DOCUMENTS

| | | | |
|---|---|---|---|
| 7,454,712 B2 | 11/2008 | Schultz | |
| 8,015,509 B2 | 9/2011 | Karstens | |
| 2003/0025830 A1* | 2/2003 | Perry | 348/441 |
| 2005/0055405 A1* | 3/2005 | Kaminsky | H04L 51/04 |
| | | | 709/206 |
| 2005/0198589 A1* | 9/2005 | Heikes | G06F 9/4443 |
| | | | 715/805 |
| 2006/0031322 A1* | 2/2006 | Kessen et al. | 709/206 |
| 2009/0271803 A1* | 10/2009 | Maman et al. | 719/318 |
| 2009/0313658 A1* | 12/2009 | Nishimura et al. | 725/59 |
| 2011/0078248 A1 | 3/2011 | Harpur et al. | |
| 2011/0145744 A1* | 6/2011 | Haynes et al. | 715/766 |
| 2012/0102403 A1 | 4/2012 | Pennington et al. | |
| 2013/0024798 A1* | 1/2013 | Schneider | H04R 25/70 |
| | | | 715/771 |

OTHER PUBLICATIONS http://dojotoolkit.org/reference-guide/1.9/dijit/Dialog.html, downloaded on Jul. 29, 2013, pp. 1-8.

* cited by examiner

*Primary Examiner* — Yi Wang
(74) *Attorney, Agent, or Firm* — Brian J. Colandreo, Esq.; Jeffrey T. Placker, Esq.; Holland & Knight LLP

(57) ABSTRACT

A method, computer program product, and computer system for defining, at a first computing device, at least a portion of a display area associated with the first computing device. A specialized communication from a second computing device is received at the first computing device. The specialized communication is rendered at the first computing device in at least the portion of the display area. Use of an application within at least the portion of the display is prevented at least while the specialized communication is accessed.

17 Claims, 9 Drawing Sheets

APPLICATION BASED DISPLAY LAYOUT SYSTEM AND METHOD

BACKGROUND

There are various ways to communicate between two or more users using available technology, such as but not limited to phone, email, and instant messaging. Instant messaging (IM), for example, may be an effective and popular way to communicate, particularly within a business environment. Unfortunately, the ability to communicate, e.g., asynchronously, may enable the IM conversation to occur where each user is not entirely focused on the IM conversation itself. For instance, there may be other distractions that could happen during the IM conversation (e.g., another IM conversation from another user, other applications running on the computing device, etc.), which may transition the user's focus away from the IM conversation at hand.

It is possible that the substance of the IM conversation may include important and/or time sensitive subject matter which may require the undivided attention of either user. For example, user A may be user B's boss and would like to get answers from user B on a critical topic. Both user A and user B may be remote from one another, and when user A starts the IM conversation with user B, user A may want to have user B's undivided attention throughout the conversation.

BRIEF SUMMARY OF DISCLOSURE

In one implementation, a method, performed by one or more computing devices, may comprise defining, at a first computing device, at least a portion of a display area associated with the first computing device. A specialized communication from a second computing device may be received at the first computing device. The specialized communication may be rendered at the first computing device in at least the portion of the display area. Use of an application within at least the portion of the display may be prevented at least while the specialized communication is accessed.

One or more of the following features may be included. The specialized communication may include an instant message. Preventing use of the application within at least the portion of the display may include preventing rendering of a display associated with the application from entering at least the portion of the display area. Defining at least the portion of the display area may include defining a layout scheme. Rendering the specialized communication may include automatically displaying the specialized communication in a pre-determined monitor of a multi-monitor display. The specialized communication may include a communication received from one or more pre-determined users. At least the portion of the display area may include a quadrant of the display area.

In another implementation, a computing system includes a processor and a memory configured to perform operations that may comprise defining, at a first computing device, at least a portion of a display area associated with the first computing device. A specialized communication from a second computing device may be received at the first computing device. The specialized communication may be rendered at the first computing device in at least the portion of the display area. Use of an application within at least the portion of the display may be prevented at least while the specialized communication is accessed.

One or more of the following features may be included. The specialized communication may include an instant message. Preventing use of the application within at least the portion of the display may include preventing rendering of a display associated with the application from entering at least the portion of the display area. Defining at least the portion of the display area may include defining a layout scheme. Rendering the specialized communication may include automatically displaying the specialized communication in a pre-determined monitor of a multi-monitor display. The specialized communication may include a communication received from one or more pre-determined users. At least the portion of the display area may include a quadrant of the display area.

In another implementation, a computer program product resides on a computer readable storage medium that has a plurality of instructions stored on it. When executed by a processor, the instructions cause the processor to perform operations that may comprise defining, at a first computing device, at least a portion of a display area associated with the first computing device. A specialized communication from a second computing device may be received at the first computing device. The specialized communication may be rendered at the first computing device in at least the portion of the display area. Use of an application within at least the portion of the display may be prevented at least while the specialized communication is accessed.

One or more of the following features may be included. The specialized communication may include an instant message. Preventing use of the application within at least the portion of the display may include preventing rendering of a display associated with the application from entering at least the portion of the display area. Defining at least the portion of the display area may include defining a layout scheme. Rendering the specialized communication may include automatically displaying the specialized communication in a pre-determined monitor of a multi-monitor display. The specialized communication may include a communication received from one or more pre-determined users. At least the portion of the display area may include a quadrant of the display area.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

System Overview

Figure 1:
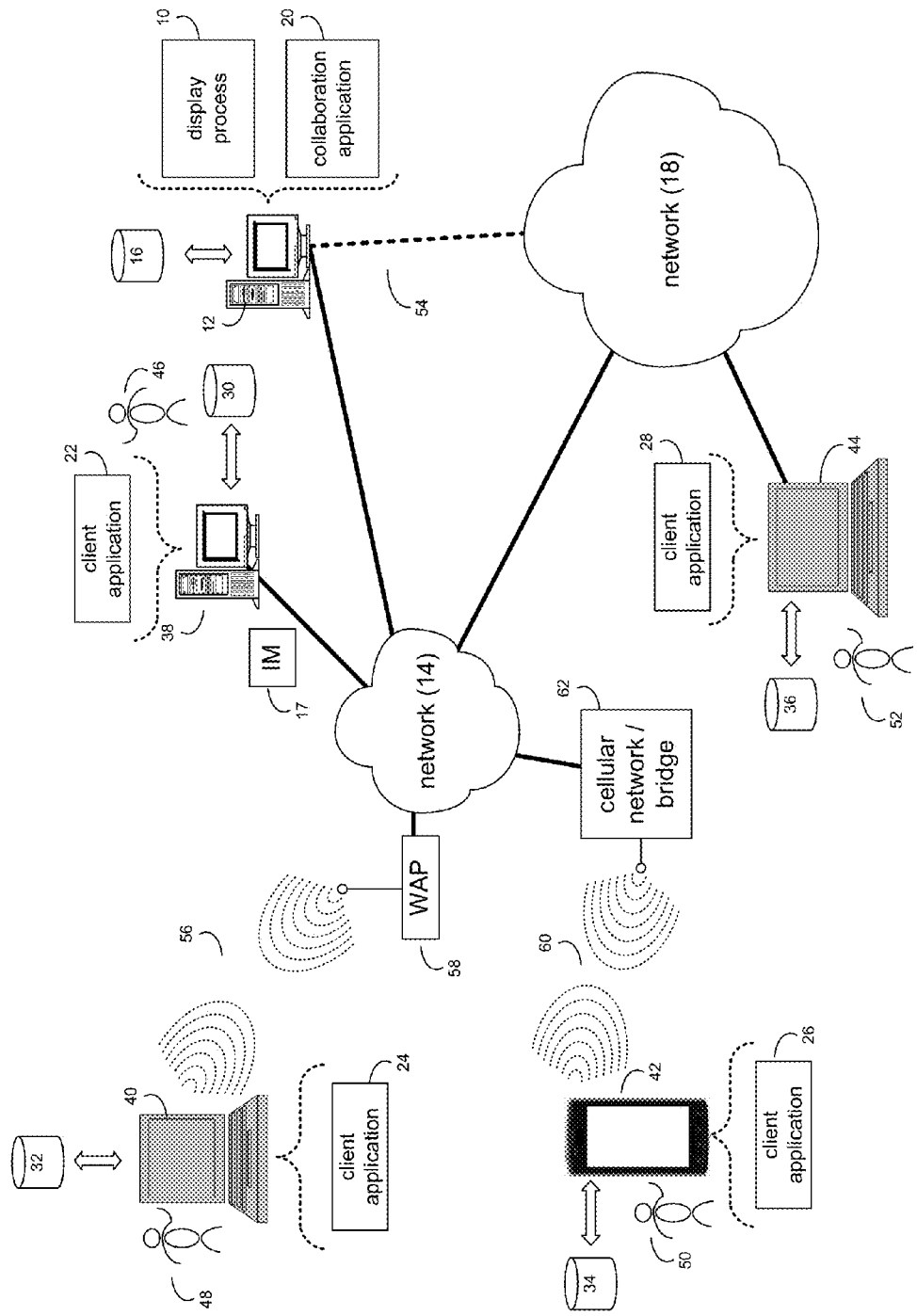
FIG. 1 is an illustrative diagrammatic view of a display process coupled to a distributed computing network according to one or more implementations of the present disclosure.

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown display process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, display process 10 may define, at a first computing device, at least a portion of a display area associated with the first computing device. A specialized communication (e.g., IM 17) from a second computing device may be received at the first computing device. The specialized communication may be rendered at the first computing device in at least the portion of the display area. Use of an application within at least the portion of the display may be prevented at least while the specialized communication is accessed.

The instruction sets and subroutines of display process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Display process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a collaboration application (e.g., collaboration application 20), examples of which may include, but are not limited to, e.g., an instant messaging (IM) application, a web conferencing application, a video conferencing application, a voice-over-IP application, a video-over-IP application, or other application that allows for virtual meeting and/or remote collaboration. Display process 10 and/or collaboration application 20 may be accessed via client applications 22, 24, 26, 28. Display process 10 may be a stand alone application, or may be an applet/application/script that may interact with and/or be executed within collaboration application 20 and/or one or more of client applications 22, 24, 26, 28. Collaboration application 20 may be a stand alone application, or may be an applet/application/script that may interact with and/or be executed within display process 10 and/or one or more of client applications 22, 24, 26, 28. One or more of client applications 22, 24, 26, 28 may be a stand alone application, or may be an applet/application/script that may interact with and/or be executed within display process 10 and/or collaboration application 20. Examples of client applications 22, 24, 26, 28 may include, but are not limited to, e.g., an instant messaging (IM) application, a web conferencing application, a video conferencing application, a voice-over-IP application, a video-over-IP application, or other application that allows for virtual meeting and/or remote collaboration, a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of display process 10 (and vice versa). Accordingly, display process 10 may be a purely server-side application, a purely client-side application, or a hybrid server-side/client-side application that is cooperatively executed by one or more of client applications 22, 24, 26, 28 and/or display process 10.

One or more of client applications 22, 24, 26, 28 may be configured to effectuate some or all of the functionality of collaboration application 20 (and vice versa). Accordingly, collaboration application 20 may be a purely server-side application, a purely client-side application, or a hybrid server-side/client-side application that is cooperatively executed by one or more of client applications 22, 24, 26, 28 and/or collaboration application 20. As one or more of client applications 22, 24, 26, 28, display process 10, and collaboration application 20, taken singly or in any combination, may effectuate some or all of the same functionality, any description of effectuating such functionality via one or more of client applications 22, 24, 26, 28, display process 10, collaboration application 20, or combination thereof, and any described interaction(s) between one or more of client applications 22, 24, 26, 28, display process 10, collaboration application 20, or combination thereof to effectuate such functionality, should be taken as an example only and not to limit the scope of the disclosure.

Users 46, 48, 50, 52 may access computer 12 and display process 10 (e.g., using one or more of client electronic devices 38, 40, 42, 44) directly through network 14 or through secondary network 18. Further, computer 12 may be connected to network 14 through secondary network 18, as illustrated with phantom link line 54. Display process 10 may include one or more user interfaces, such as browsers and textual or graphical user interfaces, through which users 46, 48, 50, 52 may access display process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
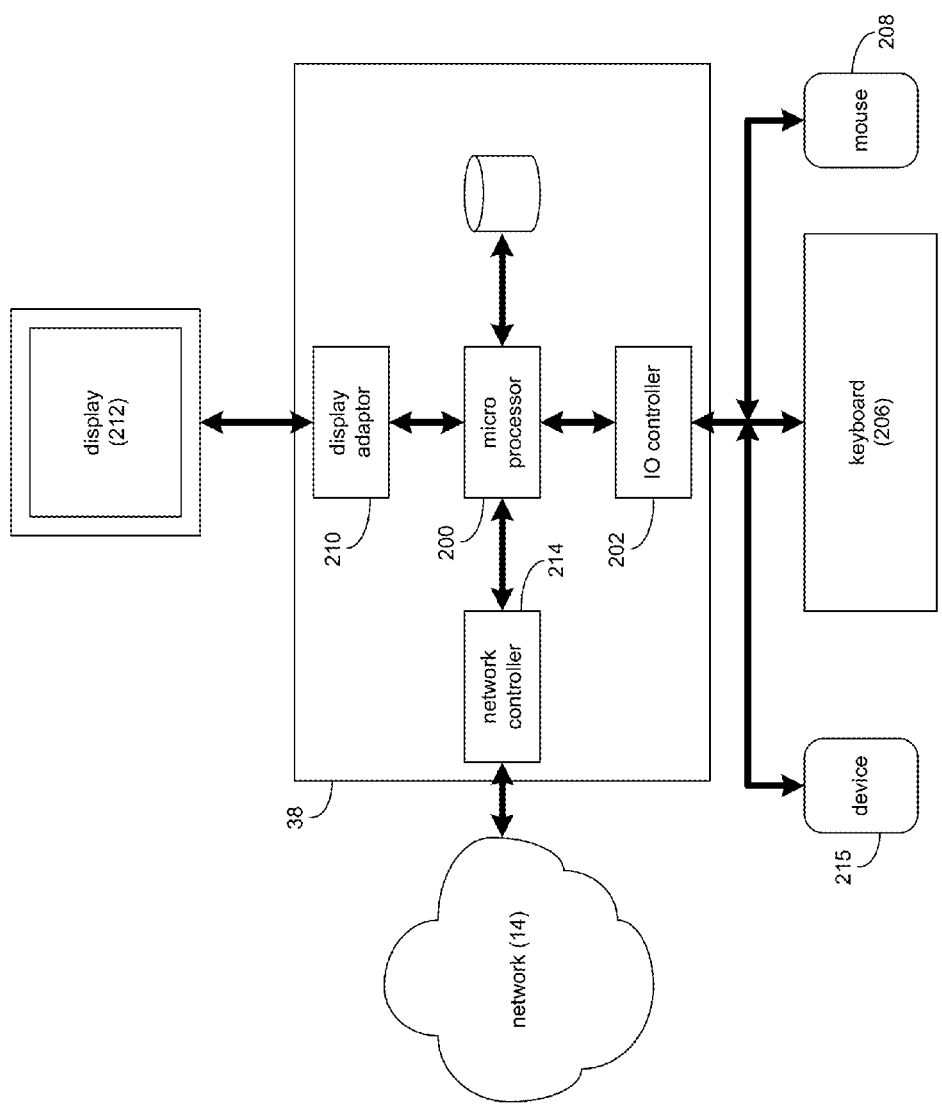
FIG. 2 is a diagrammatic view of a client electronic device of FIG. 1 according to one or more implementations of the present disclosure.
Figure 3:
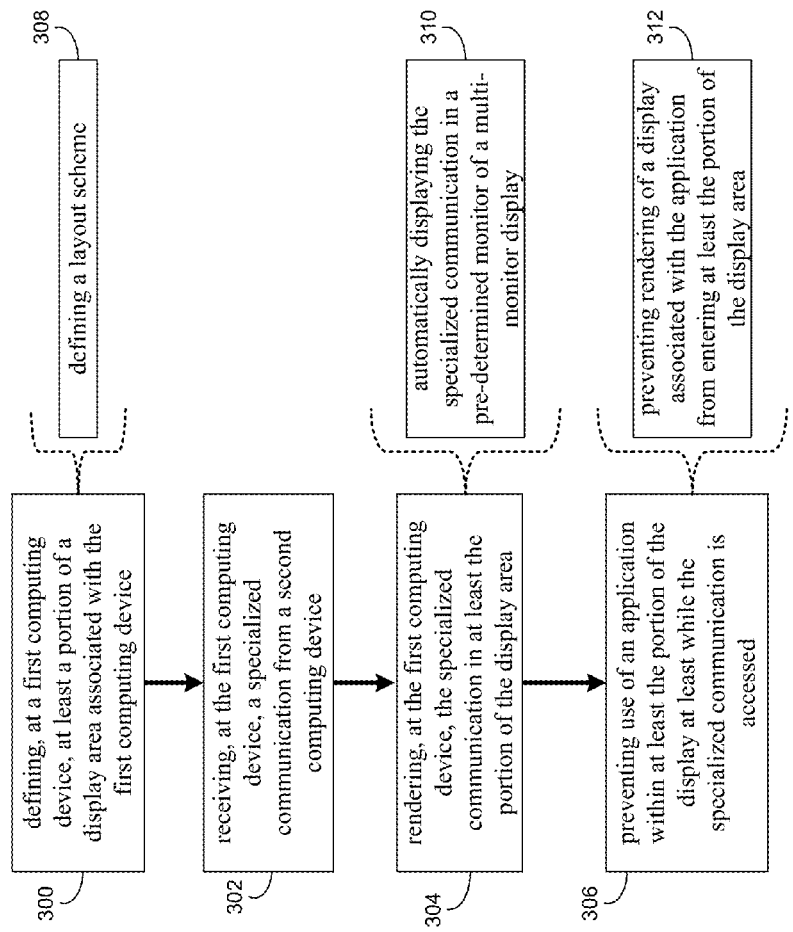
FIG. 3 is an illustrative flowchart of the display process of FIG. 1 according to one or more implementations of the present disclosure.
Figure 4:
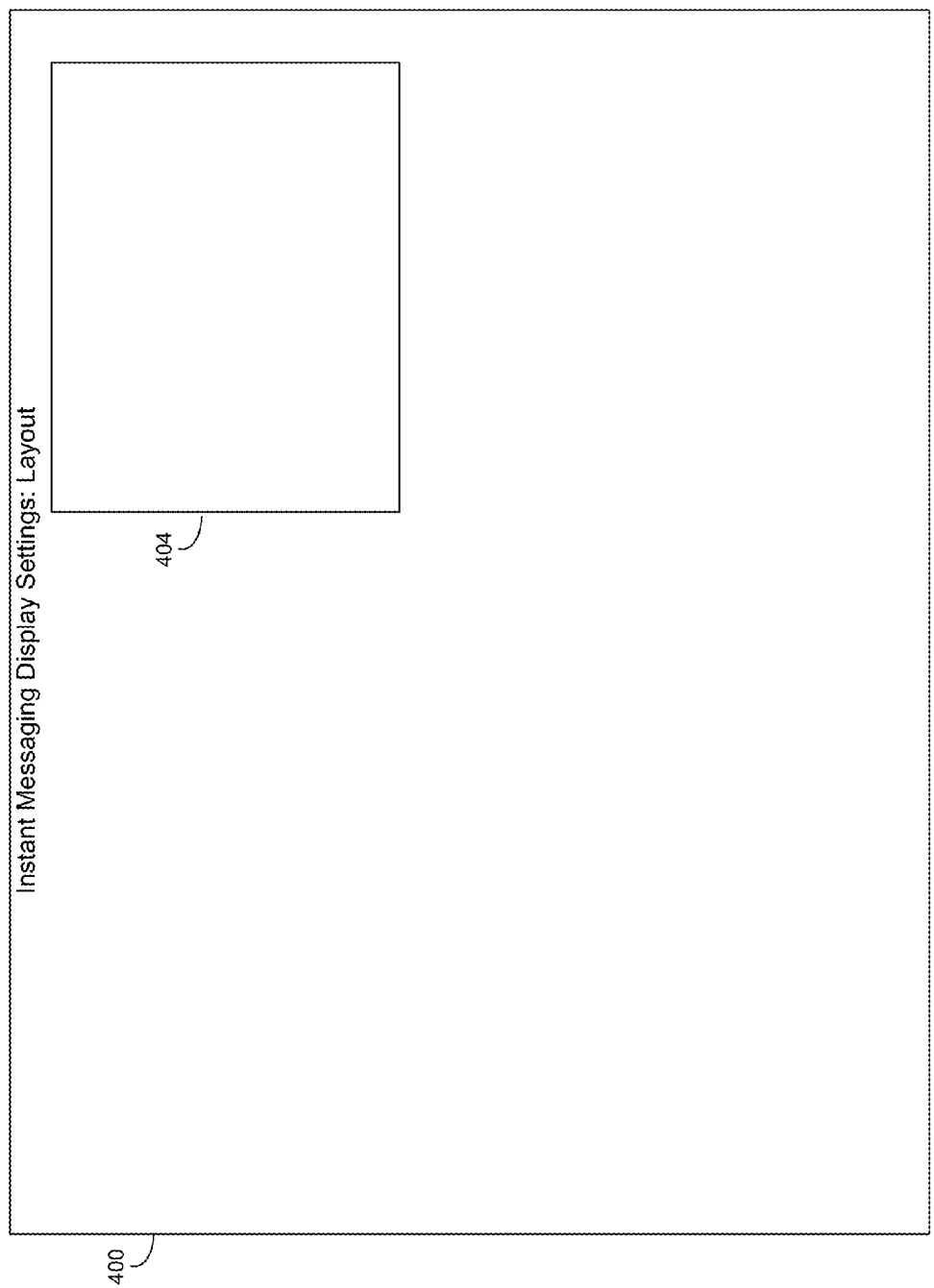
FIG. 4 is an illustrative diagrammatic view of a screen image displayed by the display process of FIG. 1 according to one or more implementations of the present disclosure.
Figure 5:
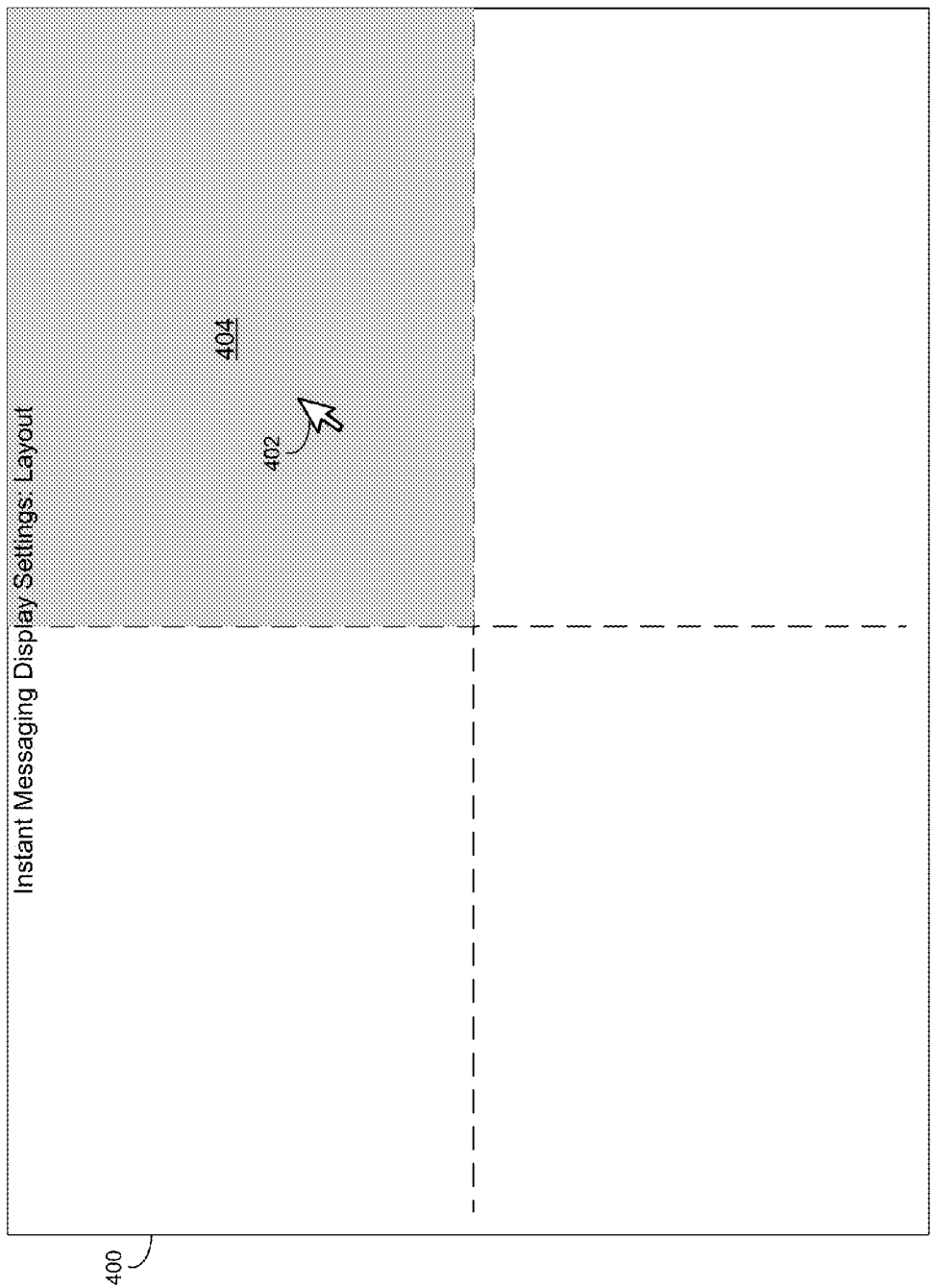
FIG. 5 is an illustrative diagrammatic view of a screen image displayed by the display process of FIG. 1 according to one or more implementations of the present disclosure.
Figure 6:
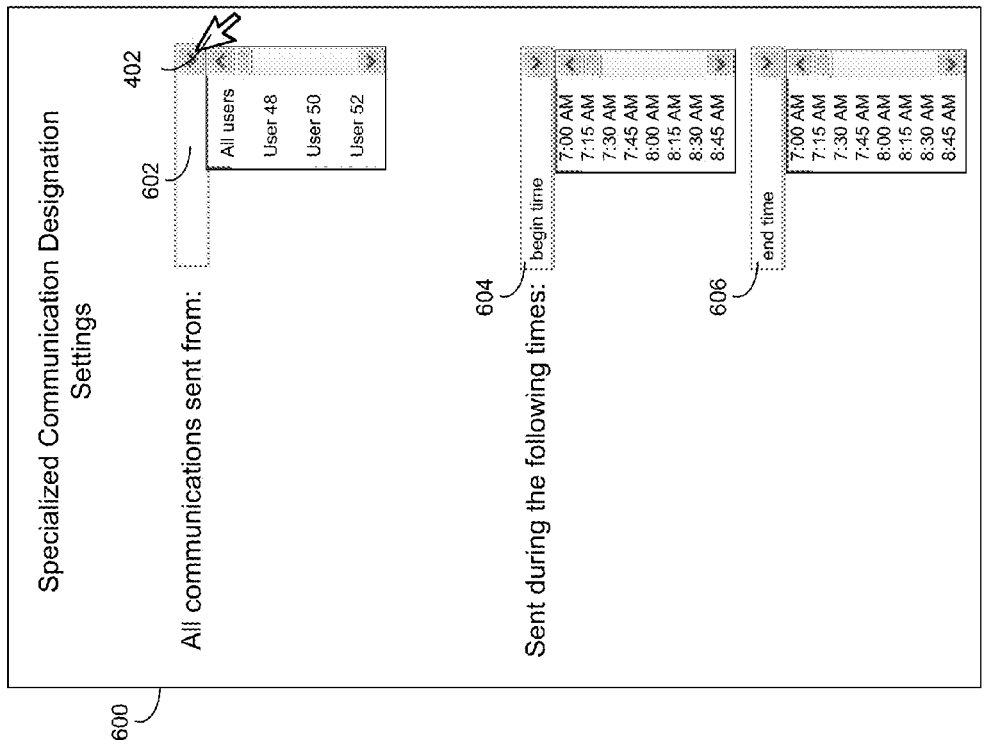
FIG. 6 is an illustrative diagrammatic view of a screen image displayed by the display process of FIG. 1 according to one or more implementations of the present disclosure.
Figure 7:
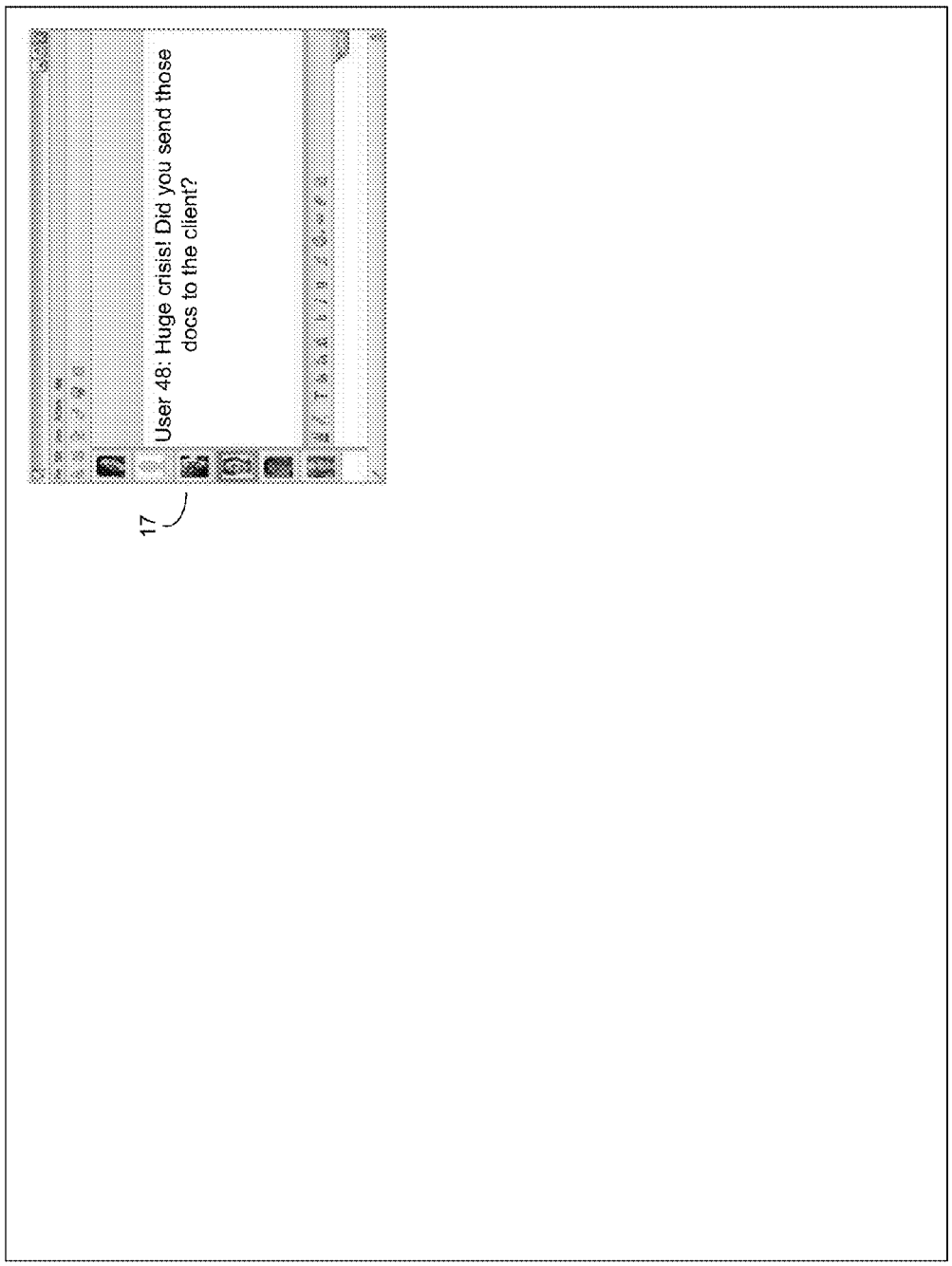
FIG. 7 is an illustrative diagrammatic view of a screen image displayed by the display process of FIG. 1 according to one or more implementations of the present disclosure.
Figure 8:
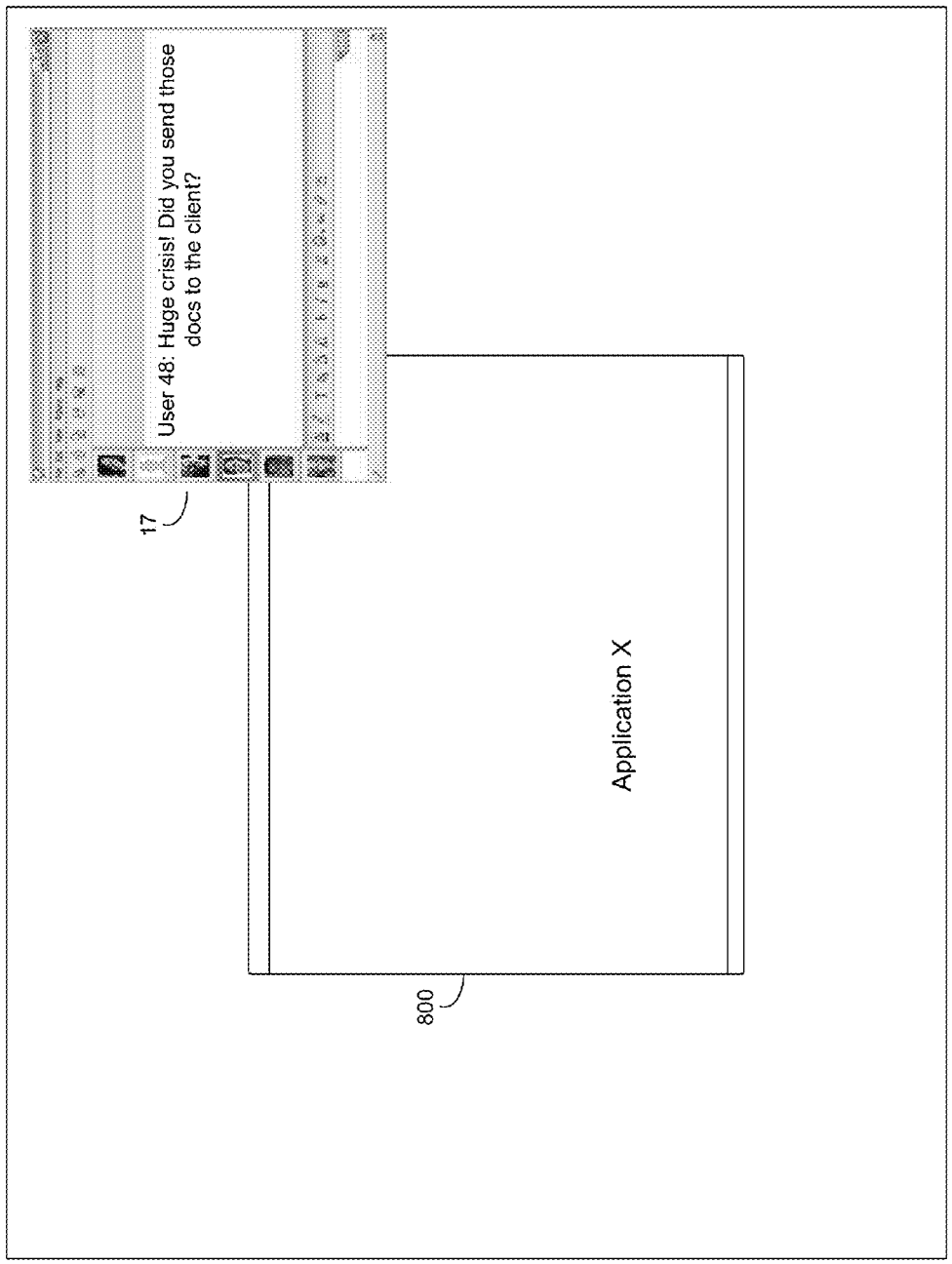
FIG. 8 is an illustrative diagrammatic view of a screen image displayed by the display process of FIG. 1 according to one or more implementations of the present disclosure.
Figure 9:
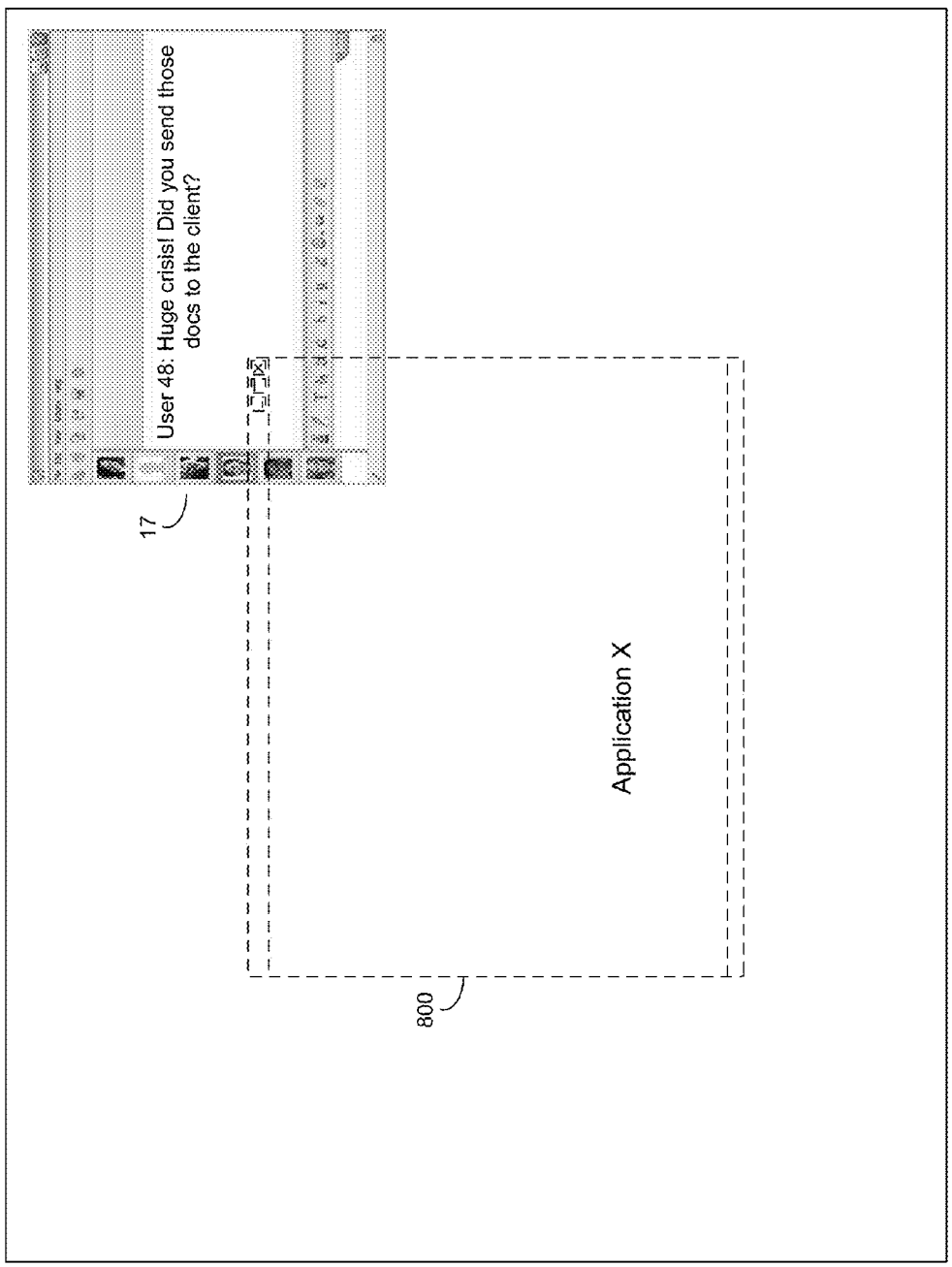
FIG. 9 is an illustrative diagrammatic view of a screen image displayed by the display process of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, display process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device. An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

The Display Process:

As discussed above and referring also to FIGS. 3-9, display process 10 may define 300, at a first computing device, at least a portion of a display area associated with the first computing device. A specialized communication from a second computing device may be received 302 by display process 10 at the first computing device. Display process 10 may render 304 the specialized communication at the first computing device in at least the portion of the display area. Display process 10 may prevent 306 use of an application within at least the portion of the display at least while the specialized communication is accessed.

As discussed above, the ability to communicate, e.g., asynchronously, may enable a conversation (e.g., an instant messaging (IM) conversation) to occur where each user is not entirely focused on the IM conversation itself. For instance, there may be distractions that could happen during the IM conversation (e.g., another IM conversation from another user, other applications running on the computing device, etc.), which may transition the user's focus away from the IM conversation at hand. It may be possible to obtain greater focus on the part of either user during the IM conversation. For instance, as will be discussed in greater detail below, portions of a monitor display may be reserved for displaying, e.g., IM communications and/or particular IM communications (e.g., from particular senders), which may be to the exclusion of display usage for other applications or purposes.

For example, in some implementations, display process 10 (alone and/or in conjunction with one or more of client application 22 and collaboration application 20) may define 300, at a first computing device (e.g., client electronic device 38), at least a portion of a display area associated with client electronic device 38. For instance, and referring at least to FIG. 4, an example user interface 400 associated with display process 10 (and/or client electronic device 38) is shown. User interface 400 may be rendered via display 212. User interface 400 associated with display process 10 may provide a representation of display 212, e.g., which may allow a portion of the display to be defined, e.g., for rendering specialized communications. Assume for example purposes only that client electronic device 38 is running an IM application (e.g., via client application 22, collaboration application 20, display process 10, or combination thereof). In the example, display process 10 may enable user 46 to select an object (not shown) associated with the IM application that may provide user 46 with user interface 400, where user 46 may further be enabled to adjust certain settings of the IM application. As will be discussed in greater detail below, one example setting may include defining 300 where IM conversations may be rendered upon receipt of an IM message.

For example, in some implementations, defining 300 at least the portion of the display area may include display process 10 defining 308 a layout scheme (e.g., for IM communications). As an example, display process 10 may enable user 46 (via user interface 400) to define 308 the layout scheme. For instance, assume for example purposes only that user interface 400 is representative of display 212 and that user 46 (via display process 10) wants to define 300 a portion of the upper right section of display 212 as being a location of display 212 for rendering one or more instant messaging communications. In the example, and referring also to FIG. 5, user 46 may user a cursor (e.g., cursor 402) to "right-click" and drag cursor 402 to create, e.g., one or more areas, to represent the portion (e.g., portion 404) of display 212 in the layout scheme. Other techniques of defining 300/308 the portion of the display area may be used without departing from the scope of the disclosure. For instance, pre-made shapes may be dragged onto user interface 400 from a tool bar (not shown) of user interface 400. As another example, cursor 402 may be used as a drawing tool to define 300/308 portion 404. As yet another example, a pre-determined layout may be selected, e.g., from the above-noted tool bar. As such, the particular "click and drag" example of defining 300/308 portion 404 should be taken as an example only and not to limit the scope of the disclosure.

In some implementations, at least the portion of the display area may include a quadrant of the display area. For example, and referring at least to FIG. 5, user interface 400 (e.g., via display process 10) may enable user 46 to select one or more quadrants of display 212 as the area defining 300 portion 404 (e.g., a portion of display 212 for displaying particular instant messaging communications). In the example, user 46 may use cursor 402 to select and define 300 (via user interface 400) an entire quadrant of display 212 as the area defining 300 portion 404. Other example layout schemes may include but are not limited to defining 300 portion 404 as the entire display area of display 212, or having the bottom of the screen always appear on top.

In some implementations, a specialized communication from a second computing device (e.g., client electronic device 42) may be received 302 by display process 10 at client electronic device 38. For example, user 48 (e.g., via client application 24 of client electronic device 40, collaboration application 20, display process 10, or combination thereof) may send the specialized communication to user 46 via client electronic device 38. In some implementations, the specialized communication (e.g., IM 17) may include an instant message. It will be appreciated that other communication examples may be used without departing from the scope of this disclosure. For example, the specialized communication may include an email. As another example, the specialized communication may include a text message. As such, the example of an instant message as the specialized communication should be taken as an example only and not to limit the scope of the disclosure.

In some implementations, the specialized communication may include a communication received 302 from one or more pre-determined users. For instance, display process 10 may enable user 46 to designate certain communications as a specialized (e.g., urgent) communications. For example, and referring at least to FIG. 6, user interface 400 may include window 600. In the example window 600 may enable user 46 to designate which user(s) should have their IMs designated by display process 10 as a specialized communication (e.g., by using cursor 402 to select drop down menu 602). In some implementations, the users which have been designated by user 46 may be required to accept an invitation to be included in the list of who should have their IMs designated by display process 10 as a specialized communication. For example, display process 10 may send an invitation to, e.g., user 48, after user 46 has used drop down menu 602 to select user 48 as having his/her IMs designated by display process 10 as a specialized communication. In the example, once user 48 has accepted the invitation, the IMs sent from user 48 to user 46 may be considered a specialized communication.

In some implementations, window 600 may include drop down menus 604 and 606 to designate times when IMs sent from users selected drop down menu 602 should be designated as a specialized communication. For example, assume that user 48 is selected in drop down menu 602, a beginning time of 7:15 am is selected from drop down menu 604, and an ending time of 5:00 pm is selected from drop down menu 606. In the example, IMs sent from user 48 to user 46 between 7:15 am and 5:00 pm may be designated as a specialized communication by display process 10. Further in the example, IMs from user 48 to user 46 that are not sent (and/or received 302) between 7:15 am and 5:00 pm may not be designated as a specialized communication by display process 10. It will be appreciated that other examples of the characteristics determining whether an IM may be designated as a specialized communication without departing from the scope of this disclosure. For example, window 600 may provide for a user's title as a possible characteristic. For instance, drop down menu 602 may include a user's label (e.g., Boss, Family Member, Stock Broker, etc.), which may be assigned by user 46 via display process 10. As another example, display process 10 may provide an object (not shown) on an IM chat window (not shown) that may enable user 48 to designate specific IMs as a specialized communication. As such, the example characteristics determining whether an IM may be designated as a specialized communication should be taken as an example only and not to limit the scope of this disclosure.

In some implementations, display process 10 may render 304 the specialized communication at the first computing device in at least the portion of the display area. For instance, referring at least to FIG. 7 and continuing with the above example, assume for example purposes only that user 48 has sent IM 17 to user 46 at 8 am (i.e., between 7:15 am and 5:00 pm) and is designated as a specialized communication by display process 10. In the example, display process 10 may render 304 IM 17 within portion 404 (as defined 300 in FIG. 4) of the display area (e.g., display 212).

In some implementations, portion 404 may include more than one portion defined 300 for more than one user and/or groups of users. For example, display process 10 (e.g., via user interface 400 and/or window 600) may enable user 46 to select the upper right quadrant of display 212 as the portion where IMs sent from family members (that also meet any other criteria to satisfy the IMs as a specialized communication) are to be rendered 304, and may further enable user 46 to select the upper left quadrant of display 212 as the portion where IMs sent from the stock broker of user 46 (that also meet any other criteria to satisfy the IMs as a specialized communication) are to be rendered 304. It will be appreciated that various combinations of users, user groups, and their respective portions within display 212 where IMs are to be rendered may be designated by user 46 (via display process 10) without departing from the scope of the disclosure.

As another example, in some implementations, rendering 304 the specialized communication may include display process 10 automatically displaying 310 the specialized communication in a pre-determined monitor of a multi-monitor display. For instance, and continuing with the above example, assume for example purposes only that user 48 has sent IM 17 to user 46 at 8 am (i.e., between 7:15 am and 5:00 pm) and is designated as a specialized communication by display process 10. Further assume that another selectable option (not shown) from user interface 400 and/or window 600 enables user 46 via display process 10 to define 300 which monitor (in a multi-monitor display) to render 304 IM 17 (e.g., main monitor, alternative monitor 1, alternative monitor 2, etc.). In the example, if user 46 selected alternative monitor 2, display process 10 may render 304 IM 17 within portion 404 (as defined 300 in FIG. 4) of the display area (e.g., display 212) for alternative monitor 2. In some implementations, a visual cue (not shown) may be rendered by display process 10 on the primary monitor to alert user 46 of IM 17 on the alternative monitor 2.

In some implementations, display process 10 may prevent 306 use of an application within at least the portion of the display at least while the specialized communication is accessed. For example, preventing 306 use of the application within at least the portion of the display may include display process 10 preventing 312 rendering of a display associated with the application from entering at least the portion of the display area. For example, and referring at least to FIG. 8, assume for example purposes only that another application (e.g., application X in window 800) may be open and at least a portion of window 800 is within portion 404 (as defined 300 in FIG. 4) of the display area (e.g., display 212). In the example, when display process 10 receives 302 the specialized message (e.g., IM 17) and renders 304 IM 17 within portion 404, the portion of window 800 within portion 404 may be covered by IM 17, thereby preventing 312 that portion of window 800 from being rendered within portion 404. In the example, display process 10 may access APIs of the above-noted operating systems executing on client electronic device 38 to prevent 312 that portion of window 800 from being rendered within portion 404. In some implementations, if user 46 (via display process 10) is no longer accessing IM 17 (e.g., IM 17 is minimized or closed), all of window 800 may be rendered.

In some implementations, preventing 306 use of application X and/or preventing rendering 312 of window 800 from entering portion 404 may include preventing 312 rendering of at least a portion of window 800 by increasing the transparency of window 800. For example, and referring at least to FIG. 9, when display process 10 receives 302 the specialized message (e.g., IM 17) and renders 304 IM 17 within portion 404, the portion of window 800 within portion 404 may become more transparent than IM 17. In some implementations, the entirety of window 800 may become more transparent than IM 17 (as shown by phantom lines of window 800).

In some implementations, preventing 306 use of application X may include a requirement that IM 17 be responded to before application X may be accessed. For example, when IM 17 is rendered 304, display process 10 may prevent user 46 from accessing window 800 until a response is returned to user 48. As another example, when IM 17 is rendered 304, display process 10 may prevent application X (or other non-critical applications) from running until a response is returned to user 48. As such, the specific examples of preventing 306 use of application X should be taken as an example only and not to limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
   defining, at a first computing device, at least a portion of a display area associated with the first computing device, wherein an application is displayed within at least the portion of the display area;
   receiving, at the first computing device, a designation of at least one communication as a specialized communication;
   receiving, at first computing device, a specialized communication from a second computing device;
   rendering, at the first computing device, the specialized communication in at least the portion of the display area;
   preventing another application from being accessed until the specialized communication is responded to; and
   preventing rendering of a display associated with the another application from entering at least the portion of the display area associated with the application by increasing transparency of the another application.

2. The computer-implemented method of claim 1 wherein the specialized communication includes an instant message.

3. The computer-implemented method of claim 1 wherein defining at least the portion of the display area includes defining a layout scheme.

4. The computer-implemented method of claim 1 wherein rendering the specialized communication includes automatically displaying the specialized communication in a predetermined monitor of a multi-monitor display.

5. The computer-implemented method of claim 1 wherein receiving a designation of at least one communication as a specialized communication includes receiving a designation of at least one communication from one or more users as a specialized communication.

6. The computer-implemented method of claim 1 wherein at least the portion of the display area includes a quadrant of the display area.

7. A computing system including a processor and a memory configured to perform operations comprising:
- defining, at a first computing device, at least a portion of a display area associated with the first computing device, wherein an application is displayed within at least the portion of the display area;
- receiving, at the first computing device, a designation of at least one communication as a specialized communication;
- receiving, at the first computing device, a specialized communication from a second computing device;
- rendering, at the first computing device, the specialized communication in at least the portion of the display area;
- preventing another application from being accessed until the specialized communication is responded to; and
- preventing rendering of a display associated with the another application from entering at least the portion of the display area associated with the application by increasing transparency of the another application.

8. The computing system of claim 7 wherein the specialized communication includes an instant message.

9. The computing system of claim 7 wherein defining at least the portion of the display area includes defining a layout scheme.

10. The computing system of claim 7 wherein rendering the specialized communication includes automatically displaying the specialized communication in a pre-determined monitor of a multi-monitor display.

11. The computing system of claim 7 wherein receiving a designation of at least one communication as a specialized communication includes receiving a designation of at least one communication from one or more users as a specialized communication.

12. The computing system of claim 7 wherein at least the portion of the display area includes a quadrant of the display area.

13. A computer program product residing on a non-transitory computer readable storage medium having a plurality of instructions stored thereon which, when executed by a processor, cause the processor to perform operations comprising:
- defining, at a first computing device, at least a portion of a display area associated with the first computing device, wherein an application is displayed within at least the portion of the display area;
- receiving, at the first computing device, a designation of at least one communication as a specialized communication;
- receiving, at the first computing device, a specialized communication from a second computing device;
- rendering, at the first computing device, the specialized communication in at least the portion of the display area;
- preventing use of an application from being accessed until the specialized communication is responded to; and
- preventing rendering of a display associated with the another application from entering at least the portion of the display area associated with the application by increasing transparency of the another application.

14. The computer program product of claim 13 wherein the specialized communication includes an instant message.

15. The computer program product of claim 13 wherein defining at least the portion of the display area includes defining a layout scheme.

16. The computer program product of claim 13 wherein rendering the specialized communication includes automatically displaying the specialized communication in a pre-determined monitor of a multi-monitor display.

17. The computer program product of claim 13 wherein receiving a designation of at least one communication as a specialized communication includes receiving a designation of at least one communication from one or more users as a specialized communication.

* * * * *